United States Patent Office 3,123,437
Patented Mar. 3, 1964

3,123,437
PURIFICATION OF A SPENT THIOCYANATE SOLVENT SOLUTION CONTAINING SULFATE IONS AS IMPURITIES
Wilhelm Georg Schmidt, Walsgrave, Coventry, and Alan Thomas Bucknall, Wyken, Coventry, England, assignors to Courtaulds Limited, London, England, a British company
No Drawing. Filed Jan. 31, 1961, Ser. No. 85,989
Claims priority, application Great Britain Feb. 3, 1960
3 Claims. (Cl. 23—75)

This invention concerns improvements in the spinning of solutions of polyacrylonitrile. By "polyacrylonitrile" we mean both homopolymers of acrylonitrile and also copolymers containing at least 80 percent by weight of acrylonitrile units. Such copolymers may be the products of copolymerisation with acrylonitrile of such other monomers as styrene, methyl acrylate, itaconic acid, methallyl sulphonic acid and its salts, vinyl acetate and vinyl pyridine. The invention is particularly applicable to copolymers containing 90 to 95 percent by weight of acrylonitrile units.

It has already been proposed to spin a solution of polyacrylonitrile in a concentrated aqueous solution of a salt, for example an inorganic thiocyanate, into a dilute aqueous solution of the same salt. The spent spin bath may be continuously withdrawn and concentrated sufficiently to make possible its re-use as solvent for polyacrylonitrile. Unfortunately, the cycling of solvent in this way leads to building up of impurities in the solvent, which among other effects results in the dyeability of the fibres spun being reduced.

An object of this invention is therefore to provide a method of improving the properties of spent solvent.

According to this invention, the method comprises precipitating barium sulphate in the spent solvent, if desired after the latter has been concentrated for re-use.

The invention may be put into practice in several different ways. According to one of these, a soluble barium compound, as such or in solution, is added to spent solvent which contains sulphate ions. The sulphate ions may have been added to the solvent in the form of a soluble sulphate, e.g. sodium sulphate, or may be a result of the presence of a sulphur-containing reducing agent during the polymerisation of the monomer or monomer mixture. The barium compound added in solution may be a soluble barium salt. For example, for treating spent sodium thiocyanate solution, barium thiocyanate may be added, for example in aqueous solution.

Another way of using the present invention is to add to the spent solvent a barium compound which has only a low solubility in the polyacrylonitrile solvent, but which is nonetheless more soluble than barium sulphate. It may be added as a solid to the solvent or may be first formed into a suspension, which latter is added to the solvent. Barium carbonate is such a low-solubility barium compound.

According to yet another method of putting the invention into practice, the spent, sulphate-containing solvent is passed through a bed comprising such a low-solubility barium compound, for example barium carbonate.

Since any barium ions present in the treated solvent give rise to fibres of reduced dyeability, it is essential that the quantity of any soluble barium compound added is insufficient to leave any barium unprecipitated as sulphate. It is convenient for the quantity of any barium-containing solution employed to be slightly less than that necessary for complete precipitation of the sulphate ions present in the solvent but it is an advantage of this invention that the sulphate concentration in the solvent may be reduced to any desired value. In removal of sulphate ions by crystal "seeding" techniques, the sulphate concentration may be reduced only to a value approaching that of saturation.

The expression "spent solvent" as we have used it herein is intended to imply a liquid which has been used as a solvent for spinning polyacrylonitrile. The liquid may, in fact, have been considerably diluted as a result of the spinning operation and require concentration before it can again be used as polymerisation solvent. The invention may be applied to the solvent either in this diluted state or after it has been concentrated but it is advantageous to use the concentrated solution since less liquid need then be treated.

The precipitation may be accelerated by carrying out the method of the invention at an elevated temperature, for example at least 35° C., but satisfactory precipitation is obtained even at room temperature. The need to heat the solvent to an elevated temperature may be avoided and yet the benefits of the elevated temperature gained by using the solvent while it is still hot from the concentration stage. The barium compound may be added as a hot solution, if desired, or the solvent may be heated to an elevated temperature, e.g. 70° to 100° C., after the barium has been added. By the use of elevated temperatures and by reacting liquids at higher concentrations, it is possible to reduce the reaction time to as little as five minutes, while with lower concentraions and temperatures the precipitation is slower and may require as much as one or two hours for completion.

One way of carrying out the precipitation at an elevated temperature is to add the barium compound to the spent solvent before the latter has been concentrated for re-use, pass the barium-containing mixture through an evaporator to concentrate the solvent, and remove the precipieated barium sulphate subsequently.

The invention will now be further described by means of the following Examples, in which percentages are by weight:

EXAMPLE 1

A sodium thiocyanate aqueous solution which contained 50.6 percent of sodium thiocyanate and 0.24 percent of sodium sulphate and which had been cycled several times as polymerisation solvent and spin bath in the production and spinning of polyacrylonitrile was divided into two portions. One of the portions, amounting to 500 cc., was heated to 100° C. and mixed with 19.37 cc. of a 1.039 N barium thiocyanate solution. The quantity of barium thiocyanate added was such that 90 percent of the sodium sulphate would be removed. The mixed solutions were held at 100° C. for 15 minutes and the precipitated barium sulphate filtered off.

The treated and untreated sodium thiocyanate solutions were then used as solvents for two polymerisations using otherwise identical polymerisation mixtures of the following composition by weight:

| | Percent |
|---|---|
| Sodium thiocyanate solution | 84.5 |
| Acrylonitrile | 14.42 |
| Methyl acrylate | 0.93 |
| Itaconic acid | 0.15 |
| | 100.00 |
| Azobisisobutyronitrile | [1] 1 |
| Thiourea dioxide | [1] 1.5 |

[1] Based on the total monomer.

Before polymerization, each mixture was adjusted to pH 7 with sodium hydroxide; polymerisation was carried out at 74° C. for 1 hour.

The two polyacrylonitrile solutions obtained were spun into distilled water to obtain filaments of about 3.4 denier and after washing and drying were separately dyed for 3 hours in an aqueous solution of Sevron Red L containing 3.2 gm. of dye/litre in quantity equivalent to 16 gm. of dye per 100 gm. of fibre.

The dye uptake of the filaments spun from the solution in the treated solvent was 10.7 percent (based on the weight of the undyed fibre). That of the fibre obtained using untreated solvent was 9.85 percent.

EXAMPLE 2

An aqueous solution containing 55 percent of sodium thiocyanate and .131 percent of sodium sulphate was divided into 100-cc. samples, which were stirred continuously for various times at various temperatures with various quantities of solid barium carbonate. The concentrations of sodium sulphate in the resulting treated solutions are given in the folowing table:

| Temperature | 45° C. | | 65° C. | | 80° C. | |
| --- | --- | --- | --- | --- | --- | --- |
| Time (hours) | 1 | 3 | 1 | 3 | 1 | 3 |
| .1 gm. $BaCO_3$ | .115 | .101 | .102 | .094 | .103 | .090 |
| .5 gm. $BaCO_3$ | .060 | .028 | | | | |
| 1 gm. $BaCO_3$ | .029 | .011 | | | | |

EXAMPLE 3

(a) Preparation of Barium Carbonate Bed 20 gm. of Metasil (a diatomaceous earth largely of silica) were impregnated in a desiccator under vaccum with 100 cc. of a 10 percent solution in water of hydrated barium chloride ($BaCl_2.2H_2O$). The solid was filtered off from the impregnating solution and then further impregnated under the same conditions with 100 cc. of a 10 percent solution in water of sodium carbonate. The Metasil was again separated from excess liquid by filtration and then washed with water and dried at 80° C.

A 5-gm. sample of the Metasil/barium carbonate bed material was transferred to a sintered glass disc of 20 mm. diameter, upon which it was spread in a uniform layer. Beds prepared in this way were used in the following liquor treatments.

(b) Treatment of Spent Solvent

An aqueous solution containing 54.5 percent of sodium thiocyanate and 0.189 percent of sodium sulphate was passed continuously at a rate of flow of 185 cc./hr. and a temperature of 45° C. through a barium carbonate bed prepared as described above. A sample of liquor comprising the first 115 cc. passed was found to contain .068 percent of sodium sulphate, while the 184-cc. sample which brought the total passed to 577 cc. contained .183 percent. At this stage the bed was regenerated as described below.

In a further experiment, an identical solution was passed through a fresh bed, at the same temperature but at a flow rate of 340 cc./hr. The first 162 cc. of liquor passed contained .089 percent of sodium sulphate; the 174-cc. sample which brought the total passed to 1178 cc. contained .181 percent.

In a third experiment, in which the temperature of the solution was only 25° C. and the flow rate was 175 cc./hr., the first 89 cc. of liquor passed was found to contain .116 percent of sodium sulphate. Thus the sulphate ion concentration of the solution had been successfully reduced, but not as efficiently as at 45° C.

(c) Regeneration of the Bed

A spent Metasil/barium carbonate bed which in being exhausted had taken .228 gm. of sodium sulphate from a sodium thiocyanate solution was regenerated to a considerable extent by passing a total of 8.7 gm. of sodium carbonate through the bed in the form of a 2 percent solution in water. A total quantity of .183 gm. of sodium sulphate was obtained from the bed.

The bed was washed with water and then a sodium-sulphate-containing aqueous solution of sodium thiocyanate was passed through until the bed was again exhausted. This time a total of .14 gm. of sodium sulphate was removed from the solution.

What we claim is:

1. A method of purifying liquids which have been used as a solvent in the spinning of filaments of homopolymers of acrylonitrile and of copolymers containing at least 80% by weight acrylonitrile residues which liquids contain sulfate ions as impurities comprising contacting the liquid with solid, pulverulent barium carbonate and then separating solids from the liquid.

2. A method as claimed in claim 1, in which the liquid is an aqueous solution of sodium thiocyanate.

3. A method as claimed in claim 1, wherein the solid barium compound is used as a bed, and in which the liquid is passed through the bed.

References Cited in the file of this patent

UNITED STATES PATENTS

| 2,977,187 | Serreze et al. | Mar. 28, 1961 |
| 2,977,188 | Serreze et al. | Mar. 28, 1961 |